July 16, 1963 R. W. BROWN ETAL 3,097,531
TANK THERMOMETER AND VALVE THEREFOR
Filed Dec. 9, 1960
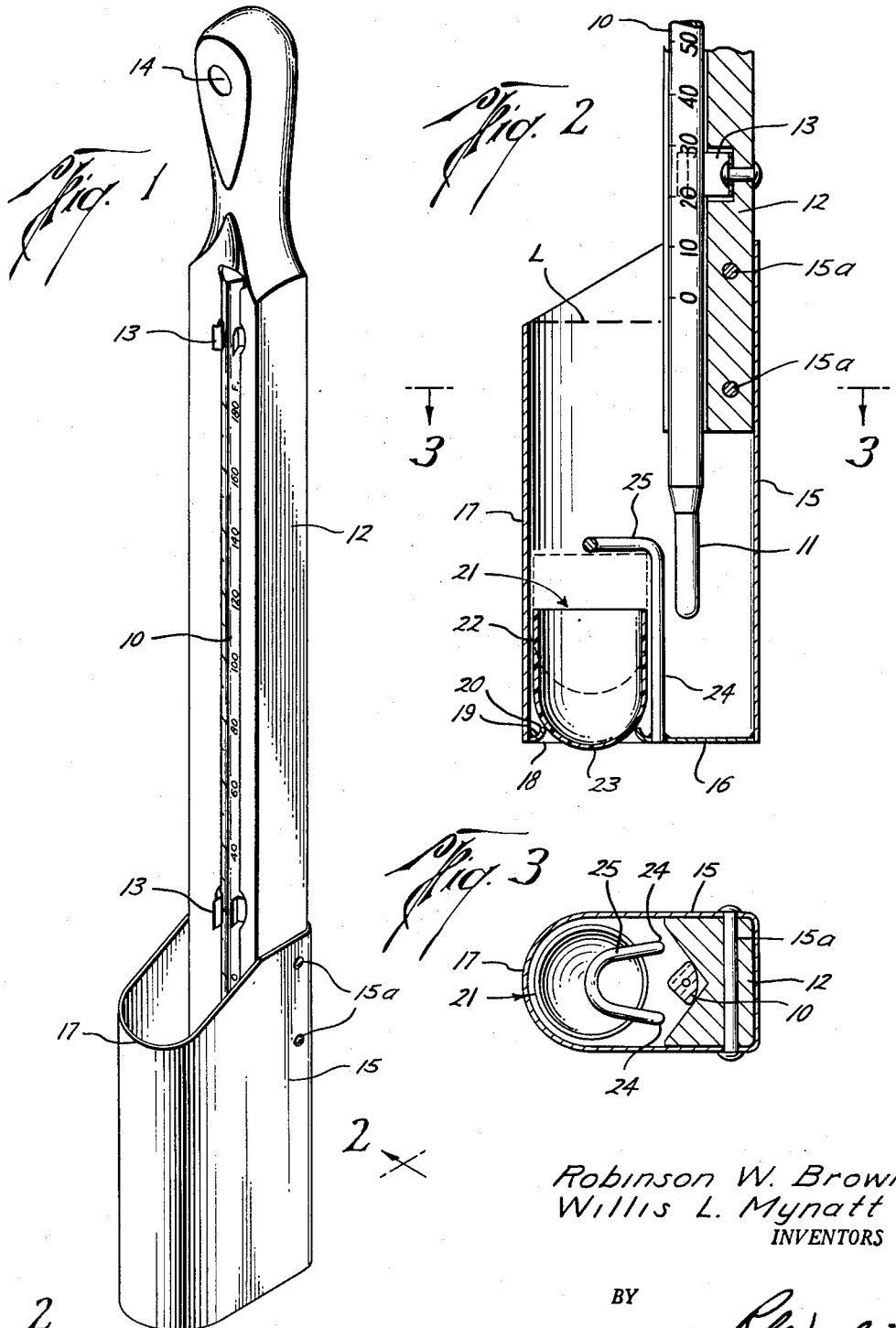
Robinson W. Brown
Willis L. Mynatt
INVENTORS
BY
ATTORNEY

United States Patent Office 3,097,531
Patented July 16, 1963

3,097,531
TANK THERMOMETER AND VALVE THEREFOR
Robinson W. Brown and Willis L. Mynatt, San Antonio, Tex., assignors to W. H. Curtin and Company, Houston, Tex., a corporation of Texas
Filed Dec. 9, 1960, Ser. No. 74,979
1 Claim. (Cl. 73—354)

This invention relates generally to tank thermometers having a receptacle for liquid, the temperature of which is to be measured, and more particularly to check valve means for use with such tank thermometers.

Tank thermometers are conventionally employed to measure the temperatures of liquids contained in storage tanks, such as those in oil refineries, chemical plants, and the like. Ordinarily, these thermometers are equipped with a cup-like receptacle, commonly called a "cage," surrounding the lower bulb portion of the thermometer and open at its upper end. The cup is adapted to fill with liquid when the thermometer is lowered into a body of the liquid in order that the thermometer may determine the temperature of that liquid.

In conventional tank thermometers, when the cage enclosing the thermometer bulb is immersed in the liquid, it immediately fills from its open top as soon as the latter descends beneath the surface of the liquid. Thereafter, as the thermometer descends through the body of the liquid, very little change in temperature of the liquid will occur, because there is no opportunity for displacement of the initially introduced liquid and the only temperature change which occurs may be a slight alteration produced by convection. Thus, when the thermometer reaches the depth at which it is desired to record the temperature, the temperature will, in fact, be substantially that of the surface layer of the liquid and will be incorrect for the particular depth to which the thermometer is lowered, thereby introducing undesirable errors in the resulting measurements of the liquid. Moreover, the sample of the liquid trapped in the cage will not be representative of the liquid at the depth for which information as to the quality and temperature is sought.

To overcome the deficiencies in existing tank thermometers, the present invention is directed to a construction providing a novel form of upwardly opening check valve in the bottom of the thermometer cage which will be buoyant and have minimum inertia so that it will open in response to the upward pressure of the liquid as the thermometer is inserted therein and will remain open allowing a continuous flow of the liquid through the cage until the desired depth is attained. Thereupon, stoppage of the downward movement or a slight upward movement will cause the valve to move to the closed position, trapping the liquid at the attained depth, the correct temperature of which may be obtained by the thermometer, as well as providing a sample of liquid which will be representative of that at the attained depth.

Ordinary check valves, having considerable mass effects as well as weight, will not perform the desired functions because in tank thermometers of the kind described, there is only a small pressure differential existing across the valve equal to the density of the liquid multiplied by the height of the cage. This value will usually be insufficient to open standard commercially available check valves. Accordingly, the present invention is directed to the provision of a unique type of check valve which will fulfill the desired objects of obtaining a correct temperature of a liquid at any selected depth in the body thereof, as well as a representative sample thereof.

According to this invention the check valve comprises a body constructed in the shape of a thimble or cup-like configuration. The thimble-shaped body is preferably constructed of flexible, resilient non-metallic plastic or rubber-like material, such as neoprene, or the like, and is formed to have thin side and bottom walls, so that the valve will be of extremely light weight such that even when filled with liquid, it will offer very low resistance to fluid flow upwardly through the cage. Thus, as the thermometer is lowered through the liquid, the liquid within the cage will change with the depth so as to be continuously representative both in quality and in temperature of the liquid through which the thermometer is passing. When the downward movement is stopped and the thermometer raised slightly, the valve will close and trap only that liquid which is present at the final depth attained by the thermometer.

Other and more specific objects and advantages of this invention will become apparent from the following detailed description when read in conjunction with the accompanying drawing which illustrates a useful embodiment in accordance with this invention.

In the drawing:
FIG. 1 is an elevational perspective view of a tank thermometer in accordance with this invention;
FIG. 2 is a longitudinal sectional view of the thermometer taken generally along line 2—2 of FIG. 1; and
FIG. 3 is a transverse cross-sectional view taken generally along line 3—3 of FIG. 2.

Referring to the drawing, there is shown a generally conventional glass mercury thermometer 10 having the usual bulb 11 at its lower end, the thermometer being supported on a wooden backing member 12 by means of the clips 13—13. The upper end of the backing member has an eye 14 for connection of a lowering line, which is usually a gage or measuring line. A cup-like receptacle or cage 15 is secured to the lower end of backing member 12 by means of rivets 15a to surround bulb portion 11. Cage 15 is of flattened tubular form and is open at its upper end and has a bottom wall 16 closing its lower end, so that the cage can serve as a receptacle to collect a sample of liquid L in which bulb portion 11 of the thermometer will be immersed. Cage 15 is preferably shaped so that the front wall 17 thereof will extend in spaced relation to the front of the backing member and the thermometer, as illustrated. A circular port 18 opens through bottom wall 16 in the space thus provided between front wall 17 and the bulb portion of the thermometer. An upwardly and inwardly tapering annular flange 19 is provided about the port 18 to define an annular valve seat 20. A check valve member, designated generally by the numeral 21, is positioned in the interior of receptacle 15 for vertical movement relative to seat 20. Check valve member 21 comprises a thimble-shaped or cuplike body 22 integrally formed with a convexly curved, preferably spherical, bottom 23 and is open at its upper end. As noted previously, valve member 21 is preferably constructed of a flexible, resilient, non-metallic material which may be one of the various synthetic plastics, including synthetic rubbers, such as neoprene, and the like, which are resistant to petroleum oil or other liquids in which the valve is to be immersed. The walls defining body 22 and bottom 23 are made quite thin so that the entire valve member 21 will be extremely light.

A guide member, of generally inverted U-shaped configuration, comprises the vertically disposed, spaced apart legs 24—24 joined together at their upper ends by the U-shaped connector 25 which is bent at right angles to legs 24. The latter have their lower ends rigidly secured to wall 16 of the cage at points adjacent port 18, connector 25 extending laterally toward front wall 17 and thereby overhanging the top of valve member 21 and in vertically spaced relation thereto, so as to form a stop to limit the extent of upward movement of the valve member relative to seat 20. The extent of the vertical movement thus provided for valve member 21 will assure full opening movement of the valve member with respect to seat 20. The spacing of legs 24 with respect to each other and to their distances from front wall 17 of the cage will be such as to constrain movement of valve member 21 in the substantially vertical direction.

In operation, when the thermometer first enters a body of liquid, valve member 21 will be empty; that is, filled only with air, and will be buoyant so that as cage 15 starts below the surface of the liquid, the valve member will float upwardly off of seat 20. As the thermometer continues to descend through the liquid, filling cage 15 and valve member 21 with the liquid, the valve member will still be light enough so that the upward pressure exerted by the liquid, as the thermometer descends, will continue to hold valve member 21 in its open position against stop 25, as indicated by the broken lines in FIG. 2, until the thermometer has been lowered to the depth at which a temperature and a sample of the liquid is to be obtained. The stoppage of the downward movement will allow the valve member 21 to fall to the closed position on seat 20. This movement can, of course, be accelerated by a slight upward movement of the thermometer by picking up on the lowering line. This will serve to trap in cage 15 a sample of the liquid actually present in the tank at the level at which the valve is caused to close. The thermometer containing the trapped sample may then be withdrawn from the tank and the temperature read and the trapped liquid transferred to another receptacle for further examination or testing, as may be desired.

As indicated previously, valve member 21 will be of very light construction so as to present minimum inertia to the force of liquid flowing through port 18. As the pressure differential existing across the valve will be equal to the density of the liquid in cage 15 multiplied by the height of the cage, this value will ordinarily be quite small and valve member 21, constructed in accordance with this invention, will be made to a total weight such that it will be movable to the port-opening position under a differential fluid pressure across the port which is in the range of about 0.015 to about 0.020 pounds per square inch.

As one example for use with a standard tank thermometer in which cage 15 is 3½ inches deep, measured along front wall 17, valve member 21 will be constructed of Thiokol type FA Rubber of 45-20 Durometer hardness. Its dimensions will be as follows:

| | |
|---|---|
| Overall height _____ inches__ | 1¼ |
| Outside diameter _____ inch__ | 1 |
| Wall thickness _____ do____ | 1/16 |
| Weight _____ grams__ | 4.505 |

While the check valve construction heretofore described has been disclosed for use particularly with a tank thermometer, it will be evident that similar valve constructions may be employed as a check valve for other types of liquid receptacles.

It will be understood that various changes and modifications may be made in the details of the illustrative embodiment within the scope of the appended claim, but without departing from the spirit of this invention.

What we claim and desire to secure by Letters Patent is:

A tank thermometer, comprising, an elongate thermometer, a rigid backing member adapted to support the thermometer in vertical position, a generally tubular cage member carried by the backing member to surround only the lower end portion of the thermometer, said cage member being open at its upper end and having a bottom wall, a port in said bottom wall, an upwardly projecting annular flange surrounding said port and defining a valve seat, and a downwardly closing check valve inside said cage member cooperating with said seat, said check valve comprising a thin-walled thimble-shaped body open at its upper end and having a convexly rounded bottom adapted to engage said seat, said body being constructed of a flexible, resilient, non-metallic material and having a weight such that the valve member is movable to port-opening position under a differential fluid pressure across said port in the range of about 0.015 to about 0.020 pound per square inch, and guide means for said valve constraining substantially vertical movement of said valve relative to the seat, and a stop member in the cage member for limiting the extent of upward movement of the valve relative to said seat, said guide means and said stop member comprising an integrally formed structure of inverted generally U-shaped configuration defined by a pair of spaced-apart leg members vertically disposed in guiding relation to one side of said valve member, said leg members having their upper end portions joined and turned to extend over the upper end of said valve member in vertically spaced relation thereto.

References Cited in the file of this patent

UNITED STATES PATENTS

| | | |
|---|---|---|
| 1,539,790 | Young _____ | May 26, 1925 |
| 2,048,720 | Williams _____ | July 28, 1936 |
| 2,271,254 | De Witt _____ | Jan. 27, 1942 |
| 2,930,238 | Kellett _____ | Mar. 29, 1960 |

FOREIGN PATENTS

| | | |
|---|---|---|
| 14,204 | Great Britain _____ | Nov. 4, 1886 |